United States Patent [19]

Petty et al.

[11] Patent Number: 5,739,238
[45] Date of Patent: Apr. 14, 1998

[54] ALKOXYSILYL-FUNCTIONAL OLIGOMERS IN CURABLE SILANE POLYMER COMPOSITIONS

[75] Inventors: Herbert E. Petty, Bethel, Conn.; Shiu-Chin H. Su, Croton-On-Hudson, N.Y.

[73] Assignee: OSi Specialties, Inc., Greenwich, Conn.

[21] Appl. No.: 747,688

[22] Filed: Nov. 12, 1996

[51] Int. Cl.$^6$ .................................................. C08F 30/08
[52] U.S. Cl. .......................... 526/279; 525/477; 528/18; 528/32
[58] Field of Search .......................... 525/477; 526/279; 528/18, 32

[56] References Cited

U.S. PATENT DOCUMENTS

| | | | |
|---|---|---|---|
| 5,219,560 | 6/1993 | Suzuki et al. | 526/279 |
| 5,358,995 | 10/1994 | Lai et al. | 526/279 |

*Primary Examiner*—Melvyn I. Marquis
*Attorney, Agent, or Firm*—Scully, Scott, Murphy & Presser

[57] ABSTRACT

Disclosed are curable compositions based on a curable polymeric component containing hydrolyzable alkoxysilyl groups and also containing an oligomeric component which is composed at least in part of units containing hydrolyzable alkoxysilyl groups. The oligomeric component serves both to lower the viscosity of the composition, and to react with the polymeric component during cure, thereby lessening the use of volatile solvents.

32 Claims, No Drawings

5,739,238

ALKOXYSILYL-FUNCTIONAL OLIGOMERS IN CURABLE SILANE POLYMER COMPOSITIONS

FIELD OF THE INVENTION

The present invention relates to polymeric compositions which can be cured into films and coatings, and to processes for making such compositions. More specifically, this invention relates to such compositions and methods wherein the polymeric composition cures by condensation of alkoxysilyl groups present on the polymeric component.

BACKGROUND OF THE INVENTION

It is possible to form effective useful films, coatings, and the like form curable compositions which contain a polymeric component that is characterized by the presence on the polymer of alkoxysilyl groups. When the composition is exposed to curing conditions, usually in the presence of cure-promoting components such as catalyst and moisture, the alkoxysilyl groups condense to form a cured polymeric network that forms adherent, durable, water-repelling seals, films, coatings, and the like.

Typical of such compositions are the interpolymers disclosed in U.S. Pat. No. 4,499,150. That patent discloses a coating system wherein a coating ("topcoat") is composed of an interpolymer obtained from one or more ethylenically unsaturated silicon-free monomers and one or more ethylenically unsaturated alkoxysilanes. The interpolymer is employed as part of a film-forming composition which also contains a catalyst and a solvent.

Incorporating a solvent in the curable composition has long been conventional practice, as typified by this patent. The solvent provides fluidity to the composition, thereby aiding in achieving ease of application of the composition and uniformity of the applied product. However, the use of solvents in applications such as these has become less desirable because of the expense and handling burdens that solvents impose, and because of increased attention to the environmental and safety concerns that solvents raise. In particular, since the solvent must be capable of volatilizing from the composition after application of the composition, the loss of the solvent to the atmosphere inherently represents an economic loss and becomes a potential atmospheric contaminant.

Resolving this problem by simply reducing the amount of solvent used, or by eliminating solvents from the curable composition, is considered unsaisfactory because such steps adversely affect the usefulness of the composition itself. In particular, the increase in viscosity realized upon removing solvent renders the composition much less convenient to use, and in many cases would render the composition completely unusable. Adjusting the amounts of other components of the composition, or adding other, less volatile, viscosity-reducing components in place of the solvent is also unsatisfactory because of the adverse effect on the curing properties of the composition and on its properties after cure.

Published International Patent Application No. WO 95/19982 represents an attempt to resolve some of these difficulties by providing a vinyldioxo compound for incorporation into the curable composition. The incorporation of this compound is said to permit reduction in the amount of volatile solvent that would otherwise be present. The inclusion of this compound into the curable composition poses uncertainties about compatibility with a variety of curable compositions, and as to the properties of the cured product which is obtained.

There remains therefore a need for a technique for providing curable alkoxysilane-based compositions that retain their desirable properties, especially workable viscosity and homogeneity, while permitting the use of less solvent. These and other features described herein are provided by the present invention.

BRIEF SUMMARY OF THE INVENTION

One aspect of this invention is a fluid composition comprising (A) a polymer obtained by polymerization of ethylenically unsaturated monomers at least a portion of which is selected from the group consisting of ethylenically unsaturated alkoxysilanes, acyloxysilanes, and mixtures thereof; and (B) an oligomer obtained by polymerization of a monomer mixture comprising one or more silanes selected from the group consisting of vinyltrialkoxysilanes, vinylalkyldialkoxysilanes, and vinyldialkylmonoalkoxysilanes, said monomer mixture containing one or more comonomers selected from the group consisting of vinyl esters, methacrylate and acrylate estsers, acrylonitrile, methacrylonitrile, ethacrylonitrile, vinyl chloride, maleate diesters, styrene and alkyl-substituted styrene; wherein the chain length of said oligomer is selected so that it is essentially non-volatile and reduces the viscosity of said component (A);

wherein said composition is curable into a film by reaction of said polymer with said oligomer upon exposure to curing conditions, optionally with addition to said composition of a cure catalyst.

Another aspect of the present invention is a method of forming a film, comprising combining said components (A) and (B) and a cure catalyst on a substrate, and exposing the resulting mixture to curing conditions.

The oligomeric component defined herein serves to reduce the viscosity of the composition, thereby providing desired fluidity, and as it reacts with the reactive component (A) the oligomeric component does not volatilize to the atmosphere or otherwise become a contaminant of the product or of the environment, and also enhances the properties of the films and coatings formed from the compositions.

DETAILED DESCRIPTION OF THE INVENTION

The Oligomeric Component

The oligomer, as will be described more fully below, is a fluid polymer having a relatively low degree of polymerization. Oligomers useful in the present invention are formed entirely, or at least in part, from vinylsilane monomers of which vinyltrialkoxysilanes, alkylvinyldialkoxysilanes, and dialkylmonoalkoxysilanes are the preferred examples. More specifically, useful vinyltrialkoxysilanes, alkylvinyldialkoxysilanes and dialkylvinylmonoalkoxysilanes include those wherein each alkoxy group contains 1 to 6 carbon atoms and preferably 1 to 3 carbon atoms, and the alkoxy groups are optionally substituted with alkoxy containing 1 to 6 carbon atoms. It is preferred that the alkoxy groups at any given silicon atom are identical. Useful alkylvinyldialkoxysilanes and dialkylvinylmonoalkoxysilanes include those wherein the alkyl group contains 1 to 6 carbon atoms and preferably 1 to 3 carbon atoms.

Examples of preferred vinyl silanes include vinyltrimethoxysilane, vinylmethyldimethoxysilane, vinyldimethylmethoxysilane, vinylmethyldiethoxysilane, vinyltriethoxysilane, vinyltrispropoxysilane, and vinyltris(2-methoxyethoxy)silane.

The oligomer can be a homopolymer of any one such vinyl silane. It can also be a copolymer of two or more of such vinyl silanes. In addition, the oligomer can be a copolymer (co-oligomer) of one or more of such vinyl silanes, with one or more comonomers containing ethylenic unsaturation. Useful comonomers include vinyl esters, particular examples of which include vinyl acetate; acrylic and methacrylic acid; esters of acrylic acid and methacrylic acid wherein the ester group contains 1 to 12 carbon atoms, preferably 1 to 4 carbon atoms, and more preferably 1 or 2 carbon atoms; nitriles such as acrylonitrile, methacrylonitrile, and ethacrylonitrile; vinyl chloride; maleate diesters wherein each ester group contains 1 to 8 carbon atoms and preferably 1 to 4 carbon atoms; styrene and methyl styrenes such as alpha-methylstyrene and vinyl toluene; acrylato($C_1$–$C_8$alkyl)trialkoxysilanes, such as gamma-acryloxypropyltrimethoxysilane; and methacrylato ($C_1$–$C_8$alkyl)trialkoxysilanes, such as gamma-methacryloxypropyl-trimethoxysilane, gamma-methacrylaoxypropyltriethoxysilane, and gamma-methacryloxymethyldimethoxysilane.

The one or more vinyl silanes should constitute a sufficient portion of the monomeric reactants present in the reaction mixture to provide an average of at least two alkoxysilane groups per molecule, and an equivalent weight per silicon atom of approximately 150 to 500.

The monomer or comonomers, as the case may be, are polymerized in known fashion via free radical polymerization techniques familiar in this art, typically initiated with any of numerous well-known compounds useful as polymerization initiators. Examples of useful initiators include di-t-butyl peroxide, t-butylperoxypivalate, azobis (isobutyronitrile), benzoyl peroxide, cumene hydroperoxide, t-butyl peracetate, isopropyl percarbonate, and butyl isopropyl peroxycarbonate. The initiator generally comprises an amount on the order of 0.1 to 10 wt. % based on the amount of monomeric or comonomeric reactants present. It is helpful to include a chain transfer agent in the reaction mixture as well, to control the average chain length of the oligomers which form. Mercaptans, such as $C_6$–$C_{12}$ alkyl mercaptans, and mercaptoalkyl trialkoxysilanes such as mercaptopropyl trimethoxysilanes, are useful for this purpose. The amount of chain transfer agent is generally 0.1 to 50 wt. %, preferably 1 to 30 wt. %, based on the amount of monomeric or comonomeric reactants present. The reaction can be carried out in an inert solvent but is preferably carried out under solvent-free conditions.

The quantities of reactant and of chain transfer agent, and the reaction conditions, are selected so that the reaction product is a liquid of low to moderate viscosity such that it flows readily. Typical viscosities are on the order of 0.2 to 3000 centistokes, preferably 1 to 3000 centistokes. The oligomer should have an average weight or a degree of polymerization sufficiently high that it is essentially non-volatile at 25° C. and atmospheric pressure, and should be low enough that it is a flowable liquid and has a lower viscosity than that of the polymeric composition to which it is to be added in accordance with the present invention. Preferably, the viscosity will be such that incorporation of 5 to 50% of the oligomer will reduce the viscosity of the coating composition to a sprayable viscosity, i.e. approximately 50 to 200 seconds (Ford Cup #4).

The Curable Polymeric Component

The curable polymeric component to which the oligomeric component is added in the present invention can comprise any polymer having hydrolyzable alkoxysilyl and/or acyloxysilyl groups. The alkoxy and acyloxy groups should each contain 1 to 6 carbon atoms and preferably 1 or 2 carbon atoms.

The polymeric component can be composed entirely of units derived from polymerization of ethylenically unsaturated silanes, or can be composed of such units as well as units derived from ethylenically unsaturated units which do not contain silicon.

Useful ethylenically unsaturated silanes include ethylenically unsaturated trisalkoxysilanes, ethylenically unsaturated monoalkylbisalkoxysilanes, ethylenically unsaturated dialkylmonoalkoxysilanes, ethylenically unsaturated trisacyloxysilanes, ethylenically unsaturated monoalkylbisacyloxysilanes, and ethylenically unsaturated dialkylmonoacryloxysilanes. The alkoxy groups should contain 1 to 6 carbon atoms each, and preferably 1 to 3 carbon atoms. The alkyl groups are optionally substituted with alkoxy containing 1 to 4 and preferably 1 to 2 carbon atoms. The alkyl substituents on the silicon should contain 1 to 6 carbon atoms and preferably 1 to 2 carbon atoms. The acyloxy groups should contain 1 to 6 carbon atoms and preferably 1 or 2 carbon atoms. Examples of preferred alkoxy groups include methoxy, ethoxy and 2-methoxyethoxy. Examples of preferred acyloxy groups include acetoxy.

The ethylenic unsaturation can be attached directly to the silicon atom, for instance as vinyl or propen-2-yl. The ethylenic unsaturation can be present as part of a chain pendant from the silicon, such as in an acrylatoalkyl, methacrylatoalkyl, crotonoyloxyalkyl, or alkenyl group. Preferably, the ethylenic unsaturation is terminal. Such pendant chains preferably contain a total of up to 10 carbon atoms and preferably contain 3, 4, 5 or 6 carbon atoms including the ethylenic group.

Mixtures of any of the foregoing monomers are also contemplated.

Examples of preferred monomers of this type include gamma-acryloxypropyltrimethoxysilane, gamma-methacryloxypropyltrimethoxysilane, vinyltrimethoxysilane, gamma-acryloxypropyltriethoxysilane, gamma-methacryloxypropyltriethoxysilane, vinyltriethoxysilane, methylvinyldimethoxysilane, dimethylvinylmethoxysilane, methylvinyldiethoxysilane, dimethylvinylethoxysilane, vinyltris(2-methoxyethoxy)silane, vinylmethyldiacetoxysilane, gamma-acryloxypropyltriacetoxysilane, and methacrylatopropyltriacetoxysilane.

The monomers not containing a silicon atom which can be incorporated into the curable polymeric component of the present invention include vinyl esters, of carboxylic acids containing up to 6 carbon atoms, particular examples of which include vinyl acetate; acrylic and methacrylic acid; esters of acrylic acid, methacrylic acid, and crotonic acid, wherein the ester group contains 1 to 12 carbon atoms, preferably 1 to 4 carbon atoms, and more preferably 1 or 2 carbon atoms; nitriles containing up to 6 carbon atoms, such as acrylonitrile, methacrylonitrile, and ethacrylonitrile; vinyl chloride; maleate diesters wherein each ester group contains 1 to 8 carbon atoms and preferably 1 to 4 carbon atoms; and styrene and methyl styrenes such as alpha-methylstyrene and vinyl toluene.

Examples of useful vinyl and acrylic esters include vinyl acetate, vinyl propionate, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, decyl methacrylate, and lauryl acrylate.

The silane monomer or combination of silane comonomers should comprise at least about 5% of the total amount of polymerizable monomers present in the reaction mixture from which the curable polymeric component of the present invention is prepared. The reaction mixture is polymerized in known fashion via free radical polymerization techniques familiar in this art, typically initiated with any of numerous well-known compounds useful as polymerization initiators. Examples of useful initiators include di-t-butyl peroxide, t-butylperoxypivalate, azobis(isobutyronitrile), benzoyl peroxide, cumene hydroperoxide, t-butyl peracetate, isopropyl percarbonate, and butyl isopropyl peroxycarbonate. The initiator generally comprises an amount on the order of 0.1 to 10 wt. % based on the amount of monomeric or comonomeric reactants present.

The amounts of reactants and the polymerization conditions are selected so that the resulting polymer exhibits a weight average molecular weight of about 500 to about 30,000. The product of this polymerization is a polymeric component containing hydrolyzable alkoxysilyl groups, which can participate in the subsequent curing reaction to form the desired final film, coating, or other cured product.

Formation and Cure of the Composition

The oligomeric component and the curable polymeric component prepared as described above are combined, typically by thorough mixing in the absence of moisture. The oligomeric component should comprise about 2% to about 70%, and preferably 5 to 50% by weight, of the total amount of the oligomeric and polymeric components present in the mixture, effective to reduce the viscosity of the mixture to render it pourable and preferably sprayable from conventional spraying equipment. The preferred viscosity range for the mixture of oligomeric and polymeric components is 50 to 200 seconds (Ford Cup #4). Other conventional components can also be present, in the amounts thereof customarily used to obtain the desired function. Examples include fillers, pigments, plasiticizers, antioxidants, UV stabilizers, mildewcides, fungicides, surfactants, nonaqueous dispersion (AND) polymers, and flow control agents.

The composition containing the polymeric and oligomeric components can be cured by exposing it to heat, or often by exposing it to moisture even at ambient conditions. Accordingly, before cure is desired the composition should be prepared and stored in a cool, moisture-free environment. The cure is desirably accelerated by the presence in the composition of a cure catalyst. Suitable cure catalyst include organic acids, such as p-toluenesulfonic acid or n-butylphosphoric acid, or organic bases, such as isophorone diamine and imidazole. Preferred catalysts include metallic salts of carboxylic acids, such as tin naphthenate, tin benzoate, tin octoate, tin butyrate, dibutyltin dilaurate, dibutyltin diacetate, and the like. The cure catalyst is present in an amount effective for the particular system, typically an amount on the order of 0.1 to 10 wt. % based on the total amount of the polymeric and oligomeric components present.

The curable compositions, including the cure catalyst, can be packaged together under anhydrous conditions, and used as such. Alternatively, the polymeric component and the oligomeric component can be packaged separately, with the catalyst. It is preferred to package the combination of the polymeric and oligomeric components together to take advantage of the beneficial effect that the oligomeric ocmponent has in lowering the viscosity of the polymeric component (and, thus, of the overall composition). In this way, application of the composition to the desired substrate is facilitated, and can be carried out readily even by means such as spraying. The composition can also be applied by brushing or dipping techniques familiar to this art.

EXAMPLES

The invention is described further in the following examples, which are provided for purposes of illustration and not limitation.

EXAMPLE 1

Into a 1-liter round bottomed flask equipped with a condenser, thermometer, hearing mantle, stirrer, and a rubber septum protecting one of the necks of the flask, was charged 360.2 g of vinyltrimethoxysilane and 1.22 g of di-b-butyl peroxide. Nitrogen was bubbled through the contents of the flask via the septum for 15 min. The flask was heated to 125° C. and maintained at that temperature for 2 hrs. By means of a syringe pump, 47.8 g of 3-mercaptopropyltrimethoxysilane was slowly introduced over 14.5 hrs through the septum with continued heating at 125° C. The contents of the flask were vacuum stripped (to 132° C. and 1.5 mm Hg) to remove volatile components to yield 240.5 g of light yellow silane oligomer having a viscosity of 32 centistokes (cs). The composition was confirmed by $^{13}C$ nmr spectroscopy and gel permeation chromatography.

EXAMPLE 2

The procedure of Example 1 was repeated, yielding 258.5 g of silane oligomer having a viscosity of 41 cs.

EXAMPLE 3

Following the procedure of Example 1, 321.2 g of methylvinyldimethoxysilane and 0.73 g of di-t-butyl peroxide were oligomerized at 107° C. with the addition of 47.1 g of 3-mercaptopropyltrimethoxysilane over 14.4 hrs by means of a syringe pump. The resulting oligomer was vacuum stripped (to 139° C. and 4.5 mm Hg) to yield 115.9 g of silane oligomer of 6.2 cs viscosity.

EXAMPLE 4

Following the procedure of Example 1, 180.8 g of vinyltrimethoxysilane and 0.67 g of di-t-butyl peroxide was added to a round bottom flask and heated to 125° C. for 2 hrs. A mixture of 47.1 g of 3-mercaptopropyltrimethoxysilane and 105 g of vinyl acetate was slowly added to the flask by means of a syringe pump over 14.5 hrs. The resulting oligomer was vacuum stripped (to 138° C. and 5 mm Hg) to yield 140.3 g of polymer of 6.2 cs viscosity.

EXAMPLE 5

Following the procedure of Example 1, a mixture of 180.8 g of vinyltrimethoxysilane, 161.3 g of methylvinyldimethoxysilane, and 0.78 of di-t-butyl peroxide was heated to 115° C. for 1.5 hrs. By means of a syringe pump, 47.1 g of 3-mercaptopropyltrimethoxysilane was added over 14.5 hrs. The resulting polymer was vacuum stripped (to 142° C. and 4.5 mm Hg) yielding 145.2 g of oligomer of 14.2 cs viscosity.

EXAMPLE 6

Following the procedure of Example 1, a mixture of 321.2 g of methylvinyldimethoxysilane, 277.8 g of xylenes and 0.73 g of di-t-butyl peroxide was heated to 120° C. By means of a syringe pump, 47 g of 3-mercaptopropyltrimethoxysilane was introduced over 14.5 hrs. The resulting oligomer was vacuum stripped (to 137° C. and 0.6 mm Hg) to yield 118 g of oligomer of 0.5 cs viscosity.

EXAMPLE 7

Following the procedure of Example 1, a mixture of 111.2 g of vinyltrimethoxysilane, 90.8 g of xylenes, and 0.41 g of di-t-butyl peroxide was heated to 125° C. A mixture of 64.6 g of vinyl acetate and 29.5 g of 3-mercaptopropyltrimethoxysilane was slowly fed into the flask contents over 14.5 hrs. The resulting oligomer was vacuum stripped (to 138° C. and 0.6 mm Hg) to yield 44 g of oligomer of 0.5 cs viscosity.

EXAMPLE 8

Following the procedure of Example 1, a mixture of 100.6 g of methylvinyldimethoxysilane, 100.2 g of xylenes, and 0.4 g of di-t-butyl peroxide was heated to 120° C. From the syringe pump, a mixture of 64.9 g of vinyl acetate and 29.5 g of 3-mercaptopropyltrimethoxysilane was added to the flask contents over 14.5 hrs. The resulting oligomer was vacuum stripped (to 135° C. and 0.6 mm Hg) to yield 67.3 g of oligomer of 6.2 cs viscosity.

EXAMPLE 9

Following the procedure of Example 1, a mixture of 366.4 g of vinyltrimethoxysilane and 2.9 g Lupersol 11 (75% t-butyl peroxypivalate in mineral spirits) was heated to 60° C. and held at that temperature for 2 hrs. From a syringe pump, 47.8 g of 3-mercaptopropyltrimethoxysilane was added to the flask contents over 14.5 hrs. The resulting oligomer was vacuum stripped (to 135° C. and 0.2 mm Hg) to yield 143.1 g of an oligomer of 6.2 cs viscosity.

EXAMPLE 10

Substituting 2.7 g of Lupersol 546 M75 (75% t-amyl peroxyneodecanoate in mineral spirits) for Lupersol 11 in Example 9, yielded 125.0 g of oligomer of 6.2 cs viscosity after vacuum stripping to 135° C. and 0.2 mm Hg.

EXAMPLE 11

Following the procedure of Example 1, a mixture of 360.2 g of vinyltrimethoxysilane and 2.7 g Lupersol 11 (75% t-butyl peroxypivalate in mineral spirits) was heated to 125° C. and held at that temperature for 1 hr. From a syringe pump, 47.8 g of 3-mercaptopropyltrimethoxysilane and 8.2 g of Lupersol 11 was added to the flask contents over 25 hrs. The resulting oligomer was vacuum stripped (to 130° C. and 1.4 mm Hg) to yield 287 g of an oligomer of 32 cs viscosity.

EXAMPLE 12

Following the procedure of Example 1, a mixture of 360 g of vinyltrimethoxysilane and 2.0 g of di-t-butyl peroxide was heated to 125° C. and held at that temperature for 1 hr. From a syringe pump, a mixture of 47.8 g of 3-mercaptopropyltrimethoxysilane and 6.1 g of di-t-butyl peroxide was added to the flask contents over 25 hrs. The resulting oligomer was vacuum stripped (to 145° C. and 2.2 mm Hg) to yield 335.6 g (82.5% conversion) of an oligomer of 41 cs viscosity.

EXAMPLE 13

Following the procedure of Example 1, a mixture of 200 g of vinyltrimethoxysilane and 2.3 g of Vazo 67 (2,2'-azobis (2-methylbutanenitrile) was heated to 78° C. and held at that temperature for 1 hr. From a syringe pump, a mixture of 26.5 g of 3-mercaptopropyltrimethoxysilane and 18.1 g of Vazo 67 was added to the flask contents over 48 hrs at 78° C. The resulting oligomer was vacuum stripped (to 135° C. and 0.1 mm Hg) to yield 154.7 g (64.3% conversion) of an oligomer of 14 cs viscosity.

EXAMPLE 14

Following the procedure of Example 1, a mixture of 89.0 g of vinyltrimethoxysilane and 1.0 g Lupersol 11 was heated to 70° C. and held at that temperature for 1 hr. From a multiple feed syringe pump, a mixture of 47.2 g of 3-mercaptopropyltrimethoxysilane, 32 g xylene and 9.5 g Lupersol 11 was added from one syringe and simultaneously 60 g of methyl methacrylate was fed from a second syringe to the flask over 16 hrs at 70° C. After the addition was complete, the resultant co-oligomer was stripped to 134° C. and 2.5 mm Hg to yield 146.4 g of clear, colorless oligomer of 400 cs viscosity.

EXAMPLE 15

Following the procedure of Example 1, a mixture of 89.0 g of vinyltrimethoxysilane and 1.0 g Lupersol 11 was heated to 70° C. and held at that temperature for 30 min. From a multiple feed syringe pump, a mixture of 23.6 g of 3-mercaptopropyltrimethoxysilane, 23 g xylene and 9.5 g Lupersol 11 was added from one syringe and simultaneously 85.3 g of butyl methacrylate was fed from a second syringe to the flask over 16 hrs at 70° C. After the addition was complete, the resultant co-oligomer was stripped to 132° C. and 2.5 mm Hg to yield 154.5 g of clear, colorless oligomer of 2700 cs viscosity.

EXAMPLE 16

Following the procedure of Example 1, a mixture of 89.0 g of vinyltrimethoxysilane and 1.3 g Lupersol 11 was heated to 70° C. and held at that temperature for 1 hr. From a multiple feed syringe pump, a mixture of 24.3 g of 1-dodecanethiol, 28 g xylene and 7.5 g Lupersol 11 was added from one syringe and simultaneously 51.7 g of vinyl acetate was fed from a second syringe to the flask over 24 hrs at 70° C. After the addition was complete, the resultant co-oligomer was stripped to 120° C. and 1.5 mm Hg to yield 108.8 g oligomer of 125 cs viscosity.

EXAMPLE 17

Following the procedure of Example 1, a mixture of 64.3 g of vinyltrimethoxysilane and 0.5 g Lupersol 11 was heated to 70° C. and held at that temperature for 1 hr. From a multiple feed syringe pump, a mixture of 16.9 g of 3-mercaptopropyltrimethoxysilane, 55 g of butyl acetate, and 8.1 g Lupersol 11 was added from one syringe and simultaneously 80.0 g of vinyl neononanoate (mixture of isomers) was fed from a second syringe to the flask over 24 hrs at 70° C. After the addition was complete, the resultant co-oligomer was stripped to 142° C. and 4.5 mm Hg to yield 107.5 g of oligomer of 340 cs viscosity.

EXAMPLE 18

Following the procedure of Example 1, a mixture of 96.3 g of vinyltrimethoxysilane and 0.5 g Lupersol 11 was heated to 70° C. and held at that temperature for 1 hr. From a multiple feed syringe pump, a mixture of 25.3 g of 3-mercaptopropyltrimethoxysilane, 47 g of butyl acetate, and 10.4 g Lupersol 11 was added from one syringe and simultaneously 83.3 g of butyl acrylate was fed from a second syringe to the flask over 24 hrs at 70° C. After the addition was complete, the resultant co-oligomer was vacuum stripped to 137° C. and 0.7 mm Hg to yield 173.2 g of oligomer of 370 cs viscosity.

EXAMPLE 19

Following the procedure of Example 1, a mixture of 111.2 g of vinyltrimethoxysilane and 0.9 g Lupersol 11 (75% t-butyl peroxypivalate in mineral spirits) was heated to 68° C. and held at that temperature for 1 hr. From a multiple feed syringe pump, a mixture of 44.2 g of 3-mercaptopropyltrimethoxysilane and 8.7 g Lupersol 11 was added from one syringe and simultaneously 39.8 g of acrylonitrile was fed from a second syringe to the flask over 24 hrs at 68° C. After the addition was complete, the resultant co-oligomer was vacuum stripped to 130° C. and 1.5 mm Hg to yield 143.2 g of oligomer of 50 cs viscosity.

EXAMPLE 20

This example illustrates preparation of a polymer useful as the polymeric component of the compositions of the present invention.

A flask equipped with a condenser, stirrer, and thermometer was charged with 218.4 g of butyl acetate, 93.6 g of VM&P naphtha and 62.4 g of toluene and the flask contents were heated to reflux. Three charges were simultaneously added to the flask over a two hour period, under a nitrogen blanket:

Charge I was formed by mixing together 582.4 g of methyl methacrylate, 291.2 g of butyl acrylate, 364.0 g of styrene, and 218.4 of gamma-methacryloxypropyltrimethoxysilane.

Charge II was formed by mixing together 125 g of butyl acetate and 72.8 g of di-t-butyl peroxide.

Charge III was formed by mixing together 124.8 g of butyl acetate and 72.8 g of gamma-mercaptopropyltrimethoxysilane.

Upon the completion of these charges to the flask, additional peroxide (5.85 g) was added and the mixture was allowed to reflux for 1.5 hrs to assure the completeness of the polymerization.

The final resin reaction product had a solids content of 68.6% and a Gardner-Holt viscosity of Z+.

EXAMPLE 21

This example illustrates the favorable lessening of viscosity provided by adding oligomers as described herein to the polymeric component. Samples (20 g) of the oligomers prepared in accordance with Examples 1–8 were blended with 100 g of the silane-acrylic polymer prepared in accordance with Example 20. The Gardner-Holdt viscosity and the solids content of the resulting mixture were measured. The results are shown in Table I:

TABLE I

| Silane added to make the mixture | Viscosity of added silane | % Solids of added silane | Viscosity of mixture | % Solids of mixture |
|---|---|---|---|---|
| None | — | — | Z+ | 68.6% |
| Example 1 | 32 cs | 79.9% | X− | 70.3% |

TABLE I-continued

| Silane added to make the mixture | Viscosity of added silane | % Solids of added silane | Viscosity of mixture | % Solids of mixture |
|---|---|---|---|---|
| Example 2 | 41 cs | 81.2% | X | 69.5% |
| Example 3 | 6.2 cs | 68.0% | V | 67.4% |
| Example 4 | 6.2 cs | 66.0% | V | 66.4% |
| Example 5 | 14.2 cs | 78.5% | W | 67.7% |
| Example 6 | 0.5 cs | 53.4% | U | 64.1% |
| Example 7 | 0.5 cs | 53.2% | U | 61.9% |
| Example 8 | 6.2 cs | 63.4% | V | 66.4% |

The viscosity readings expressed as letters are in accordance with Gardner-Holdt viscosity measurements are set forth in ASTM Test D-1545-63. As is known for this terminology, in any pair of letter readings the letter which is nearer the end of the alphabet signifies relatively higher viscosity.

The results shown in Table I indicates that mixtures of the oligomeric and polymeric components as described herein afford compositions with lessened viscosity, rendering them more fluid and thus more workable, while retaining desirably high solids contents.

Analogous results are also obtained when the composition is prepared with a cure catalyst and a solvent, as set forth in the following example.

EXAMPLE 22

To 92 g of the silane-acrylic resin prepared in Example 20 was added 10 ml of a 75% toluene/25% xylene solvent mixture to which had been added 5 wt. % of dibutyltin dilaurate, a cure catalyst. The resulting mixture was found to have a solids content of 62.1% and a Ford Cup #4 viscosity of 304 seconds.

Samples (18.4 g) of oligomers prepared in accordance with Examples 1–8 were added to the above resin-catalyst mixture, and the viscosities and solids contents were measured. The results are shown in Table II:

TABLE II

| Silane added to make the mixture | Viscosity of added silane | % Solids of added silane | Viscosity of mixture | % Solids of mixture |
|---|---|---|---|---|
| None | — | — | 304 sec | 62.1% |
| Example 1 | 32 cs | 79.9% | 158 sec | 65.9% |
| Example 2 | 41 cs | 81.2% | 165 sec | 66.9% |
| Example 3 | 6.2 cs | 68.0% | 133 sec | 63.0% |
| Example 4 | 6.2 cs | 66.0% | 144 sec | 62.9% |
| Example 5 | 14.2 cs | 78.5% | 151 sec | 64.2% |
| Example 6 | 0.5 cs | 53.4% | 120 sec | 60.4% |
| Example 7 | 0.5 cs | 53.2% | 104 sec | 59.3% |
| Example 8 | 6.2 cs | 63.4% | 142 sec | 62.8% |

EXAMPLE 23

The oligomers prepared in accordance with Examples 1–8 were formulated with the silane-acrylic polymer prepared in accordance with Example 20 into coating compositions. A control composition was also prepared containing the polymer of Example 20 but not containing the oligomeric component of the present invention. The components and amounts of these compositions are set forth in Table III:

TABLE III

| Component | Amount (wt %) | |
|---|---|---|
| | Composition of the invention | Control |
| Silane-acrylic polymer of Example 20 | 55.8% | 55.8% |
| Oligomer of Example 1-8 | 20.0% | (none) |
| Dibutyltin laurate (10 wt. % in xylene) | 5.0% | 5.0% |
| Acetone | 9.0% | 18.4% |
| Toluene | 10.2% | 20.8% |

Each formulation was coated onto a panel of cold rolled steel primed with a cathodically electrodeposited epoxy paint, and then cured at 140° C. for 30 minutes. The properties of the coatings are set forth in Table IV:

TABLE IV

| Oligomer from Ex.: | Gloss 20°[1] | Gloss 60°[1] | DQI[2] | MEK Double Rub[3] | Gel Content | % Elongation[4] | Pencil Hardness[5] | Sward Hardness[6] | Slip Angle[7] |
|---|---|---|---|---|---|---|---|---|---|
| Control | 80 | 90.7 | 100 | >400 | — | 3.8[8] | B | 25 | 21.2° |
| 1 | 88 | 91 | 100 | >400 | 88.3% | 33.6 | H | 44 | 15° |
| 2 | 89 | 91 | 100 | >400 | 89.6% | 33.6 | H | 46 | 18.2° |
| 3 | 89 | 92 | 100 | >400 | 90.3% | 33.6 | F | 44 | 12.4° |
| 4 | 88 | 91 | 100 | >400 | 89.9% | 33.6 | F | 46 | 16.5° |
| 5 | 90 | 94 | 100 | >400 | 88.0% | 33.6 | F | 46 | 12.1° |
| 6 | 90 | 93 | 100 | >400 | — | 33.6 | F | 46 | 13.1° |
| 7 | 88 | 92 | 100 | >400 | — | 33.6 | F | 44 | 14.2° |
| 8 | 89 | 92 | 100 | >400 | 92.3% | 33.6 | F | 46 | 15° |

[1]-ASTM D-523
[2]-Distinctness of image.
[3]-ASTM D-4752-87
[4]-Conical mandrel.
[5]-ASTM D-3363-74
[6]-ASTM D-2143-27
[7]-with 818 grams of weight.
[8]-film cracked at 4.3 inches.

The gel content was the weight of cured film remaining after exposure to refluxing acetone for 6 hours at 140° C. About 0.2–0.3 grams of film is removed from the substrate and wrapped in stainless steel mesh screen. A higher gel content is desirable as it connotes a more complete cure.

What is claimed is:

1. A fluid composition comprising:
   (A) a polymeric component obtained by polymerization of ethylenically unsaturated monomers at least a portion of which is selected from the group consisting of ethylenically unsaturated alkoxysilanes, ethylenically unsaturated acyloxysilanes, and mixtures thereof; and
   (B) an oligomeric component obtained by polymerization of a monomer mixture comprising one or more silanes selected from the group consisting of vinyltrialkoxysilanes, vinylalkyldialkoxysilanes, and vinyldialkylmono-alkoxysilanes, said monomer mixture optionally containing one or more comonomers selected from the group consisting of vinyl esters, methacrylate esters, acrylate esters, nitriles containing up to 6 carbon atoms, vinyl chloride, maleate diesters, styrene, and methyl-substituted styrene; wherein the average chain length of said oligomeric component is selected so that it is essentially non-volatile and reduces the viscosity of said composition;
   wherein said composition is curable into a film by reaction of said polymeric component with said oligomeric component by adding to said composition a cure catalyst and curing said composition.

2. A composition according to claim 1 wherein said one or more silanes polymerized in obtaining said oligomeric component are selected from compounds wherein the alkyl groups contain 1 to 6 carbon atoms and the alkoxy groups contain 1 to 6 carbon atoms.

3. A composition according to claim 1 wherein said one or more silanes polymerized in obtaining said oligomeric component are selected from compounds wherein the alkyl groups contain 1 to 3 carbon atoms and the alkoxy groups contain 1 to 3 carbon atoms.

4. A composition according to claim 1 wherein said one or more silanes polymerized in obtaining said oligomeric component are selected from the group consisting of vinyltrimethoxysilane, vinylmethyldimethoxysilane, vinyldimethylmethoxysilane, vinylmethyldiethoxysilane, vinyltriethoxysilane, vinyltrispropoxysilane, and vinyltris(2-methoxyethoxy)silane.

5. A composition according to claim 1 wherein said oligomeric component is obtained by polymerization of a monomer mixture comprising said one or more silanes and one or more monomers selected from the group consisting of esters of acrylic acid and esters of methacrylic acid wherein the ester group contains 1 to 4 carbon atoms, acrylato($C_1$ to $C_6$alkyl)trialkoxysilanes, and methacrylato($C_1$ to $C_6$alkyl) trialkoxysilanes.

6. A composition according to claim 1 wherein the monomer mixture polymerized in obtaining said oligomeric component comprises a sufficient proportion of said one or more silanes to provide an average of at least two alkoxysilane groups per molecule of said oligomer and an equivalent weight per silicon atom of approximately 150 to 500.

7. A composition according to claim 1 wherein said oligomeric component (B) has a viscosity of 0.2 to 3000 centistokes.

8. A composition according to claim 1 wherein said ethylenically unsaturated alkoxysilanes and ethylenically unsaturated acyloxysilanes are selected from the group consisting of ethylenically unsaturated trisalkoxysilanes, ethylenically unsaturated monoalkyl-bisalkoxysilanes, ethylenically unsaturated dialkylmonoalkoxysilanes, ethylenically unsaturated trisacyloxysilanes, ethylenically unsaturated monoalkyl-bisacyloxysilanes, and ethylenically unsaturated dialkylmonoacyloxysilanes wherein the alkyl groups are optionally substituted with alkoxy containing 1 to 4 carbon atoms.

9. A composition according to claim 8 wherein said ethylenically unsaturated alkoxysilanes and ethylenically unsaturated acyloxysilanes are selected from compounds wherein the alkoxy, alkyl and acyl groups contain 1 to 6 carbon atoms.

10. A composition according to claim 1 wherein the monomers polymerized in obtaining said polymeric component comprise one or more ethylenically unsaturated monomers selected from the group consisting of gamma-acryloxypropyltrimethoxysilane, gamma-methacryloxypropyltrimethoxysilane, vinyltrimethoxysilane, gamma-acryloxypropyltriethoxysilane, gamma-methacryloxypropyltriethoxysilane, vinyltriethoxysilane, methylvinyldimethoxysilane, dimethylvinylmethoxysilane, methylvinyldiethoxysilane, dimethylvinylethoxysilane, vinyltris(2-methoxyethoxy)silane, vinylmethyldiacetoxysilane, gamma-acryloxypropyltriacetoxysilane, and methacrylatopropyltriacetoxysilane.

11. A composition according to claim 1 wherein the monomers polymerized in obtaining said polymeric component comprise one or more comonomers not containing a silicon atom.

12. A composition according to claim 11 wherein said one or more comonomers not containing a silicon atom are selected from the group consisting of vinyl esters of carboxylic acids containing up to 6 carbon atoms; acrylic and methacrylic acid; esters of acrylic acid, methacrylic acid, and crotonic acid, wherein the ester group contains 1 to 12 carbon atoms; nitriles containing up to 6 carbon atoms; vinyl chloride; maleate diesters wherein each ester group contains 1 to 8 carbon atoms; and styrene and methyl styrenes.

13. A composition according to claim 12 wherein said one or more comonomers not containing a silicon atom are selected from the group consisting of vinyl acetate, vinyl propionate, methyl acrylate, ethyl acrylate, propyl acrylate, butyl acrylate, 2-ethylhexyl acrylate, methyl methacrylate, ethyl acrylate, propyl methacrylate, butyl methacrylate, 2-ethylhexyl methacrylate, decyl methacrylate, and lauryl acrylate.

14. A composition according to claim 1 wherein said oligomeric component comprises about 2% to about 70%, by weight, of the total amount of the oligomeric and polymeric components present in said composition.

15. A composition according to claim 1 wherein said oligomeric component comprises about 5% to about 50%, by weight, of the total amount of the oligomeric and polymeric components present in said composition.

16. A composition according to claim 1 wherein the viscosity of said composition is 50 to 200 seconds (Ford Cup #4).

17. A method of forming a film, comprising providing a mixture comprising:
(A) a polymeric component obtained by polymerization of ethylenically unsaturated monomers at least a portion of which is selected from the group consisting of ethylenically unsaturated alkoxysilanes, ethylenically unsaturated acyloxysilanes, and mixtures thereof; and
(B) an oligomeric component obtained by polymerization of a monomer mixture comprising one or more silanes selected from the group consisting of vinyltrialkoxysilanes, vinylalkyldialkoxysilanes, and vinyldialkylmono-alkoxysilanes, said monomer mixture optionally containing one or more comonomers selected from the group consisting of vinyl esters, methacrylate esters, acrylate esters, nitriles containing up to 6 carbon atoms, vinyl chloride, maleate diesters, styrene, and methyl-substituted styrene; wherein the average chain length of said oligomeric component is selected so that it is essentially non-volatile and reduces the viscosity of said composition;
and (C) a cure catalyst on a substrate, and curing the resulting mixture.

18. A method according to claim 17 wherein said one or more silanes polymerized in obtaining said oligomeric component are selected from compounds wherein the alkyl groups contain 1 to 6 carbon atoms and the alkoxy groups contain 1 to 6 carbon atoms.

19. A method according to claim 17 wherein said one or more silanes polymerized in obtaining said oligomeric component are selected from compounds wherein the alkyl groups contain 1 to 3 carbon atoms and the alkoxy groups contain 1 to 3 carbon atoms.

20. A method according to claim 17 wherein said one or more silanes polymerized in obtaining said oligomeric component are selected from the group consisting of vinyltrimethoxysilane, vinylmethyldimethoxysilane, vinyldimethylmethoxysilane, vinylmethyldiethoxysilane, vinyltriethoxysilane, vinyltrispropoxysilane, and vinyltris (2-methoxyethoxy)silane.

21. A method according to claim 17 wherein said oligomeric component is obtained by polymerization of a monomer mixture comprising said one or more silanes and one or more monomers selected from the group consisting of esters of acrylic acid and esters of methacrylic acid wherein the ester group contains 1 to 4 carbon atoms, acrylato($C_1$ to $C_6$alkyl)trialkoxysilanes, and methacrylato($C_1$ to $C_6$alkyl)trialkoxysilanes.

22. A method according to claim 17 wherein the monomer mixture polymerized in obtaining said oligomeric component comprises a sufficient proportion of said one or more silanes to provide an average of at least two alkoxysilane groups per molecule of said oligomer and an equivalent weight per silicon atom of approximately 150 to 500.

23. A method according to claim 17 wherein said oligomeric component (B) has a viscosity of 0.2 to 3000 centistokes.

24. A method according to claim 17 wherein said ethylenically unsaturated alkoxysilanes and ethylenically unsaturated acryloxysilanes are selected from the group consisting of ethylenically unsaturated trisalkoxysilanes, ethylenically unsaturated monoalkyl-bisalkoxysilanes, ethylenically unsaturated dialkylmonoalkoxysilanes, ethylenically unsaturated trisacyloxysilanes, ethylenically unsaturated monoalkyl-bisacyloxysilanes, and ethylenically unsaturated dialkylmonoacyloxysilanes wherein the alkyl groups are optionally substituted with alkoxy containing 1 to 4 carbon atoms.

25. A method according to claim 24 wherein said ethylenically unsaturated alkoxysilanes and ethylenically unsaturated acyloxysilanes are selected from compounds wherein the alkoxy, alkyl and acyl groups contain 1 to 6 carbon atoms.

26. A method according to claim 17 wherein the monomers polymerized in obtaining said polymeric component comprise one or more ethylenically unsaturated monomers selected from the group consisting of gamma-acryloxypropyltrimethoxysilane, gamma-methacryloxypropyltrimethoxysilane, vinyltrimethoxysilane, gamma-acryloxypropyltriethoxysilane, gamma-methacryloxypropyltriethoxysilane, vinyltriethoxysilane, methylvinyldimethoxysilane, dimethylvinylmethoxysilane, methylvinyldiethoxysilane, dimethylvinylethoxysilane, vinyltris(2-methoxyethoxy)silane, vinylmethyldiacetoxysilane, gamma-acryloxypropyltriacetoxysilane, and methacrylatopropyltriacetoxysilane.

27. A method according to claim 17 wherein the monomers polymerized in obtaining said polymeric component comprise one or more comonomers not containing a silicon atom.

28. A method according to claim 27 wherein said one or more comonomers not containing a silicon atom are selected from the group consisting of vinyl esters of carboxylic acids containing up to 6 carbon atoms; acrylic and methacrylic acid; esters of acrylic acid, methacrylic acid, and crotonic acid; wherein the ester group contains 1 to 12 carbon atoms; nitriles containing up to 6 carbon atoms; vinyl chloride; maleate diesters wherein each ester group contains 1 to 8 carbon atoms; and styrene and methyl styrenes.

29. A method according to claim 28 wherein said one or more comonomers not containing a silicon atom are selected from the group consisting of vinyl acetate, vinyl propionate, methyl acrylate, ethyl acrylate, propyl acrylate, butyl acrylate, 2-ethylhexyl acrylate, methyl methacrylate, ethyl acrylate, propyl methacrylate, butyl methacrylate, 2-ethylhexyl methacrylate, decyl methacrylate, and lauryl acrylate.

30. A method according to claim 17 wherein said oligomeric component comprises about 2% to about 70%, by weight, of the total amount of the oligomeric and polymeric components present in said composition.

31. A method according to claim 17 wherein said oligomeric component comprises about 5% to about 50%, by weight, of the total amount of the oligomeric and polymeric components present in said composition.

32. A method according to claim 17 wherein the viscosity of said composition is 50 to 200 seconds (Ford Cup #4).

* * * * *